Figure 1:
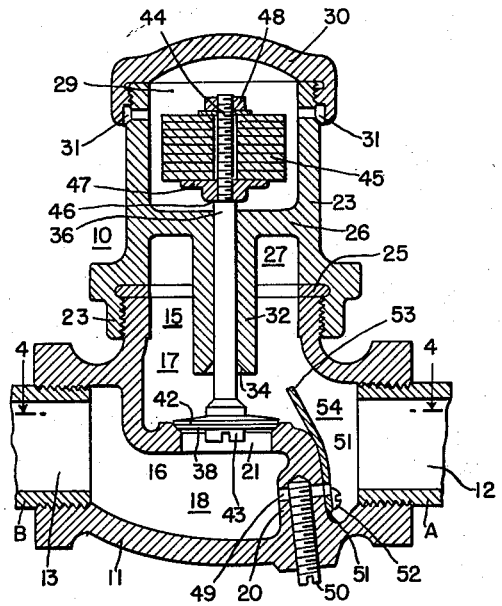

March 25, 1952 A. E. HORMAN 2,590,250
EXCESS FLOW CHECK VALVE
Filed Sept. 10, 1948

INVENTOR.
ALFRED E. HORMAN
BY
Warren S. Orton
ATTORNEY

UNITED STATES PATENT OFFICE 2,590,250

EXCESS FLOW CHECK VALVE

Alfred E. Horman, New York, N. Y.

Application September 10, 1948, Serial No. 48,594

5 Claims. (Cl. 251—148)

The invention relates to a safety device for protecting gas and other fluid conducting lines from the effects of breakage therein beyond the safety device and which devices are sometimes referred to as excess flow check valves. Such valves are usually installed in the fluid supply lines just in advance of the house or other place to be protected for shutting off the fluid supply automatically from such place on an abnormal drop of pressure at or adjacent the discharge end of the line.

It is a requirement of the National Board of Fire Underwriters that gas supply companies equip their flow lines at different strategic points along the same with automatic cut-offs set to maintain the line open under normal operating conditions and which will close the line automatically when the pressure at the inlet of any of the control valves exceeds a pre-fixed permissible pressure at the outlet side of the valve. Preferably, it is also a practical requirement of such safety devices that they automatically re-set themselves to open the line when the normal operating pressure conditions for which the device is set have been restored, without necessity of manually re-setting a previously tripped valve. Many attempts have been made to provide excess flow check valves to meet these requirements economically, but without commercial success. Many reasons, contribute to the difficulties of providing satisfaction under practical conditions, but for the most part such valves now on the market are complicated in structure; contain too many parts which are liable to get out of order; they normally depend upon springs for closing the valves but these springs deteriorate in time, requiring inspection and re-setting; and, in general, known devices are either unreliable, they do not function promptly, or are too expensive to manufacture.

Another factor which must be taken into consideration in meeting practical requirements in this art is that the valves should not cut off the supply completely and those now known are usually designed to permit or provide for slight leakage past the valve so that when the valve is closed the restoration of operating pressure conditions therein will result in either a more or less equalizing of pressures on opposite sides of the valve or an approach to such equalizing as will cause the valve to move off its seat and into its normal inoperative position, restoring the line to its normal open condition.

The primary object of the invention is to provide a form of excess flow pressure check valve which normally will be maintained in open position by reason of the presence of a substantial equality in pressures on opposite sides of the valve, or, more accurately, which will remain open and thus not close in the presence of such small differences in pressure as may occur in variations in flow conditions during normal use and which will close promptly on an abnormal drop in pressure at its discharge end.

This objective is obtained primarily by the use of a two-faced differential check valve distinguished from all similar known devices in that the side of the valve which has the greater pressure area faces its seat and thus is exposed to the relatively lower pressure conditions at the outlet, and the opposite or lesser pressure area faces and is thus exposed to the relatively higher pressure condition of the flow from the inlet. Under these conditions the valve will be held off its seat whenever the outlet pressure times the larger area on the adjacent side of the valve exceeds the inlet pressure times the lesser area of the valve on the opposite side facing the inlet, or, rather, facing the direction of flow from the inlet.

For further objectives the invention features simplicity in construction; the providing of an organization in which movable parts are reduced to a single valvular unit; to provide a form of valve casing which will provide for ready access to its interior for repairs or for adjustments in sensitivity of the contained valvular unit and to do this without necessity of breaking into the flow line.

These objectives are attained by designing the valve casing so as to have two separate chambers, a closed valve chamber to contain the flow-controlling valve and an open, readily accessible chamber fashioned to provide access to the valvular unit to adjust the same in order to vary its sensitivity and to do this without necessity of disturbing the flow through the casing.

The most serious objection to valves of this type now known is their lack of sensitivity to respond to those conditions which require the valve to close and particularly objectionable is the time delay of the normally open valve to close promptly in response to operating differentials in pressure conditions which call for the closing of the line.

It has been found that the delay in the seating movement of the valve, even under those pressure conditionos which positively call for, and which eventually are effective in causing such seating, is due to the resistant flow or surge action of the incoming fluid. In most devices the incoming fluid enters the valve chamber between the closing valve and its seat and strikes the valve transversely; that is, more or less in the plane of the valve and thus approximately in the plane of its seat, with the result that the flowing liquid is acting in a tendency to prevent the seating of the valve.

The present disclosure features in the designing of the valve casing the contouring of the conduit in the portion thereof between the inlet and the valve seat in such way as will tend to direct the incoming fluid away from direct contact with the seating side of the valve and to direct the flow by reaction on to the opposite side of the valve and to cause the flow to impinge on the valve in the direction to assist it on to its seat.

In the case herein illustrated this objective is most easily attained simply by interposing a baffle between the inlet and the valve seat so as to direct the incoming flow against a wall facing the valve seat and from which the flow can be reflected on to the valve in line with the direction of closing movement of the valve.

Various other objects and advantages of the invention will be in part obvious from an inspection of the accompanying drawings and in part will be more fully set forth in the following particular description of one form of apparatus embodying the invention, and the invention also consists in certain new and novel features of construction and combination of parts hereinafter set forth and claimed.

Figure 2:
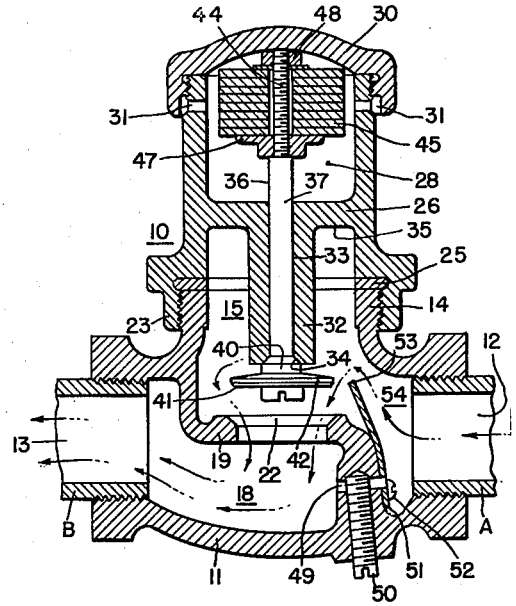
Figure 3:
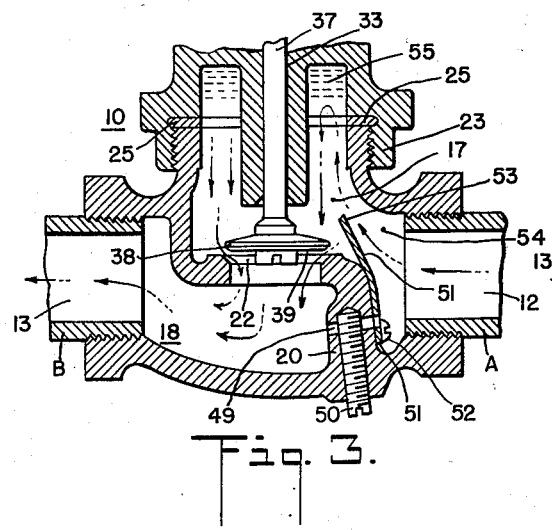
Figure 4:
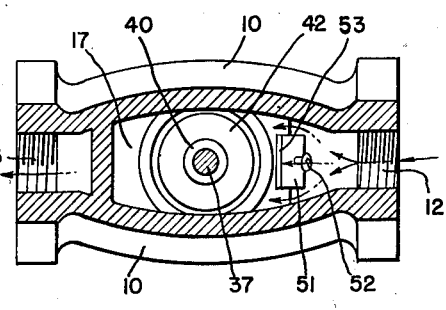

In the accompanying drawings:

Figs. 1, 2 and 3 are each vertical sectional views through a preferred embodiment of the invention shown installed in Figs. 1 and 2 in a gas conducting flow line adjacent its discharge end. Fig. 1 shows the valve seated and thus intercepting or substantially intercepting the flow of fluid therethrough from its inlet to its outlet; Fig. 2 shows the valve in its unseated, normally open position and with the flow line open; and Fig. 3 shows the valve moving towards its seats and in position at the instant just before it engages its seat; and Fig. 4 is a transverse sectional view taken on the line 4—4 of Fig. 1, looking downwardly in the direction indicated by the arrows.

In the drawing there is shown a valve casing 10 particularly constituting the novel subject matter of this disclosure and interposed in a pipe line, pipes A and B of which are shown screwed into opposite ends of the casing 10. The valve casing comprises primarily three separate parts screwed together to form the complete casing. One of the parts includes a hollow shell 11 provided at one end with an inlet 12 into which the pipe A is threaded, and with an outlet 13 into which the pipe B is threaded. At one end of the shell there is an outstanding externally threaded bell 14 which outlines a side opening 15. The shell is provided with an interior partition 16 of somewhat L-shaped form in axial cross section, dividing the interior of the shell into an upper valve chamber 17 and a lower discharge chamber 18. The partition includes a horizontally disposed wall 19 overlapping the inner end of the discharge chamber 18 and a vertical wall 20 between the discharge chamber 18 and the inlet 12. The horizontal wall 19 is provided centrally thereof with a valve seat opening 21. The outer upper side is beveled to provide a frusto-conical main valve seat 22 disposed to face upwardly, that is, to face the direction of flow from the inlet 12.

Another part of the valve casing is a cylindrical barrel-like extension 23, the lower end of which is provided with an annular flange 23 in telescoping threaded engagement with the bell 14. A gasket 25 is interposed between the bell and extension 23.

The barrel is provided mid-height thereof with a barrel partition 26 which divides the extension into a lower chamber 27 and an upper chamber 28. The lower chamber is open to and forms an upward extension of the valve chamber 17. The upper chamber 28 has its upper end 29 wide open to provide ready access to the loading features therein and hereinafter described. The open end 29 is closed by a closure cap 30 in screw-threaded engagement with the upper end of the extension. The extension and associated part of the closure cap is provided with several bleeder ports 31 for placing the chamber 28 at all times in communication with the external atmosphere. The extension 23 includes a valve-guiding stem 32 which depends centrally from the barrel partition 26 and extends into the valve chamber and terminates just above the valve seat. The sleeve 32 is provided with a long bore 33 which opens at its lower end into the valve chamber 17 and at its upper end into the chamber 28. The lower end of the sleeve 32 is counterbored at the bore 33 to provide a supplemental valve seat 34. The portion of the barrel partition which faces downwardly and is exposed to the valve chamber about the sleeve 33 forms a reflective face or wall 35.

Mounted within the casing is a freely floating valvular construction 36. This construction includes a stem 37 guided in the bore 33 with its lower end projecting into the valve chamber 17 and its upper end projecting into the upper chamber 28. The stem is provided at its lower end with a compound valve 38. The compound valve includes two superposed valves, the lower valve forming a main valve 39 for engaging the main valve seat 22 and the upper valve forming a relatively small plug-like supplemental valve 40 for engaging the supplemental valve seat 34 to defeat leakage through the bore 33 when the compound valve is in its elevated position as shown in Fig. 2. The main valve 39 is of the differential type whose lower or seat-engaging side 41 is of relatively large area, while its opposite or upper face 42 is of relatively small area, being reduced by the cross section of the stem 37. The valves are demountably held in place by means of a screw 43 threaded into the lower end of the stem. The stem in the portion terminating in the weight chamber is provided with fastening means 44 for mounting a plurality of disk-like weights 45 on the valvular structure to load the same. For this purpose the upper end of the stem is reduced, forming a shoulder 46 on which is fitted a disk-like seat 47. The set of weights 45 is threaded on the reduced threaded end 48 of the stem 37 and clamped in place by means of a nut and washer assembly 48 engaging the threads.

In order to provide a means for equalizing pressure on opposite sides of the valve seat in those situations where the valve snugly fits its seat, the vertical wall 20 is provided with a pressure equalizing vent 49 by-passing the main valve seat 22. A metering screw 50, accessible from the outside of the shell, extends transversely across the vent to regulate the rate at which the fluid passes through the vent when the screw is partially backed away from its seat, or to completely close the vent as shown in Figs. 1 and 2 when this feature is not desired.

A particular feature of novelty in this disclosure is that a baffle plate 51 is located between the inlet and the valve seat in such position as to prevent or at least intercept the direct flow of the fluid from the inlet to the valve seat. The baffle plate is secured in place by a screw 52. Actually in the instance illustrated the upper edge 53 of the baffle plate is sufficiently high to reach the level of the valve when in its elevated position as shown in Fig. 2. The presence of this baffle plate causes the portion 54 of the conduit between the inlet and the valve seat to assume an S-shaped form.

In operation and referring first to Fig. 1, it will be understood that that number of disk weights 45 will be used which has been found experimentally to give the desired sensitivity to the operation of the valve under the current flow conditions present for the time being. In this case the valvular unit will fall gravitationally by reason of its own weight into position to close the valve seat and thus intercept the flow therethrough.

In order to set the device for initial operation the metering screw 50 is backed to permit the fluid from the inlet to pass through the equalizing vent until pressures on opposite sides of the valve seat are equalized or substantially so. Whenever the pressure at the outlet sufficiently approaches the pressure at the inlet to operate the valve it will be elevated by reason of the fact that it is a differential valve against the valve closing effect of its weight and will elevate itself into the position shown in Fig. 2, and will remain in this position, opening communication through the line so long as the predominating force is acting vertically to unseat the valve. Incidentally, as the compound valve 38 is elevated the supplemental valve 40 will close onto its seat 34 and thus prevent leakage from the valve chamber 17. The normal position will persist as long as the normal flow conditions are present in the device.

In the event there is a break in the line supplied by the pipe B, or for other causes the pressure at the outlet drops sufficiently, the pressure conditions on opposite sides of the valve change, and if the drop in pressure at the outlet is sufficient, the valve will move on its seat as shown in Fig. 1 and flow through the line intercepted.

It so happens in actual practice that this valve seating movement is sometimes quite sluggish, presumably due to the fact that in most devices of this character the flow of gas from the inlet is directed at least in part onto the underside of the closing valve. This is more or less contra to the closing movement of the valve, thus resisting at least momentarily the tendency of the weighted valve to close. In the illustrated case, however, the baffle 51 prevents any direct contact of the flowing gas from the inlet on to the advancing underside of the valve, and, on the contrary, the baffle acts as a directive means for turning the flow upwardly away from the valve to impinge against the reflective face 35 forming the top of the valve chamber. The gases, of course, tend to become compacted in the upper portion of the valve chamber and presumably form a gas cushion as indicated at 55. The actively moving gas strikes the face 35 or, perhaps more accurately, strikes this cushion, reverses its path of movement and moves downwardly on top of the valve acting on the same in the direction to seat the valve as indicated by the reversed curved flow lines in Fig. 3. In other words, the portion of the conduit between the inlet and the valve as viewed in Fig. 3 forms a re-entrant curve whose discharge end faces directly on to the top side of the differential valve to thus direct the full force of the flow exactly in the direction to cause the valve to snap on to its seat without any material assistance from the weight of the floating valvular unit.

It has been found experimentally that the resulting rapid closing of the valve herein featured was due apparently not so much by reason of the pressure differential of the valve as it was due to the surge of the gas and the excessive volume of the escaping gas past the closing but not yet closed valve.

The valve then will be acted upon by three force elements all tending to move the valve on to its seat: first, by reason of the weight of the valvular structure, supplemented by one or more of the added weights 45 if used; second, by the overbalancing static force of the gases acting on the differential valve; and third, by the kinetic force inherent in the current flow or surging of the gases reversed in direction of flow and impinging on the differential valve as herein featured.

In the instant case it is intended that the main valve 39 have a slightly leaking engagement with its seat 22 in the Fig. 1 showing. In such case there is no need of the bleeding vent 49 for even with the valve closed in the sense of substantially shutting off the flow past the valve seat, still even a slight leakage past the seated valve, and assuming the conditions are otherwise favorable, pressures on opposite sides of the valve will tend to become equalized and this will eventually cause the valve to open automatically.

I claim:

1. In a protective device for closing a conduit in the event of excessive flow therethrough, the combination of a valve casing comprising three separate parts screwed together, one of said parts being a hollow shell having an inlet at one end, an outlet at the opposite end, an opening in the side thereof, and an interior partition facing the side opening and dividing the interior of the shell into a valve chamber and a discharge chamber, said partition provided with an opening normally placing the two chambers in fluid communication, said opening on the side facing the valve chamber being beveled to form a main valve seat facing the flow from the inlet, another of said parts being a barrel-like extension closing the side opening and provided with a barrel partition dividing in the interior thereof into an extension chamber opening into the valve chamber and a weight-containing chamber whose outer end is open for access thereto, and the third part constituting a closure cap for closing the open end of the weight-containing chamber, the barrel partition provided with a bore extending between the valve chamber and the weight-containing chamber and perpendicular to the plane of the main valve seat, the portion of the barrel partition outlining the bore at the end facing the valve chamber being beveled to form a secondary valve seat, a freely floating valvular construction comprising a stem guided in the bore and provided at the end of the stem within the valve chamber with two superposed valves, one of said two valves forming a main valve of the differential type fashioned to fit the main valve seat with its greater area exposed to the pressure in the discharge chamber and its lesser area exposed to the pressure in the valve chamber and said valve operative when in engagement with its seat to close the same at least substantially, and a secondary valve fashioned to fit the secondary valve seat to defeat leakage from the valve chamber out through the bore, the end of the stem within the weight-containing chamber provided with fastening means for securing one or a plurality of weight-forming disks to the valvular construction and at least one of said disks secured to the stem by said fastening means and operating in a tendency to load the main valve and to move the same gravitationally on to its associated main valve seat.

2. The device defined in claim 1 which includes a baffle plate fixed to the shell and located in the valve chamber and in the flow path between the inlet and the main valve for directing the incoming fluid in a direction away from the valve and onto the barrel partition and said barrel partition acting as a reflector for reversing the direction of flow and for discharging the fluid on to the main valve in a direction tending to seat the main valve.

3. An excess flow check valve including a valve casing provided with a conduit extending therethrough having at one end an inlet and at its other end an outlet and therebetween having means forming a valve seat facing the direction of flow from the inlet and provided with an opening therethrough forming a portion of the conduit between its inlet and outlet, a differential valve normally biased to fall gravitationally on to the seat to close the same at least substantially, the area of the valve on the side thereof engaging the seat and thus the area exposed to the pressure of the fluid passing therethrough at the outlet being greater than the area of the valve on the opposite side exposed to the pressure at the inlet whereby normally and with a free flow through the conduit and thus with the pressures on opposite sides of the seat approximately balanced the valve will be held off its seat and the conduit open, means for guiding the valve along a pressure line perpendicular to the plane of the valve seat and means including a baffle plate located in the conduit between the inlet and the valve seat for directing the fluid reflectively on to the smaller area of the valve and in the direction to close the valve on to its seat.

4. A protective device for closing a conduit in the event of excessive flow therethrough including a valve casing provided with a valve chamber having an inlet and an outlet and otherwise closed, said chamber including two walls facing each other and with the inlet opening into the chamber between the two walls, one of the walls provided with an opening forming the outlet and forming a valve seat surrounding the opening, a valve for the seat provided with a stem guided in the other wall, said valve on the side thereof engaging the seat having an area exposed to the pressure at the outlet greater than the area on the opposite side exposed to the pressure at the inlet and said valve thus held normally spaced from the valve seat and thus biased to remain open during normal flow of the fluid past the valve, and flow directive means located in the casing between the inlet and the valve seat for directing the incoming fluid away from any initial direct contact with the valve on to said other wall and said other wall acting as a reflector to change the direction of flow into a movement on to the smaller area side of the valve and operating in a tendency to move the valve on to its seat when the pressure at the outlet is reduced over that at the inlet.

5. A protective device for closing a conduit in the event of excessive flow therethrough, the combination of a valve casing provided with a conduit having an inlet and an outlet, means in the conduit forming a valve seat facing the flow from the inlet, a differential valve for engaging the seat to close the conduit at least partially, means for guiding the valve to and from its seat, the area of the valve facing the seat being greater than the area of the opposite side of the valve facing the flow, whereby during normal flow and with the pressures substantially equal on opposite sides of the valve, the valve will be held off its seat and the conduit open, said casing provided with a reflective wall facing said opposite side of the valve, and means in the conduit and located between the inlet and valve seat for directing the incoming flow from the inlet directly on to said reflective wall to be reflected therefrom on to the valve to close the same, thus operative in a tendency to move the valve quickly on to its seat by reason of the surging of the liquid past the valve when the pressure at the outlet falls below the pressure at the inlet an amount sufficient to close the valve on to its seat.

ALFRED E. HORMAN.

REFERENCES CITED

The following references are of record in the file of this patent:

UNITED STATES PATENTS

| Number | Name | Date |
| --- | --- | --- |
| 854,393 | Wirt | May 21, 1907 |
| 981,313 | Robinson | Jan. 10, 1911 |
| 1,631,142 | Masters | June 7, 1927 |
| 2,038,289 | Herbster | Apr. 21, 1936 |
| 2,223,699 | Norgren | Dec. 3, 1940 |